United States Patent Office.

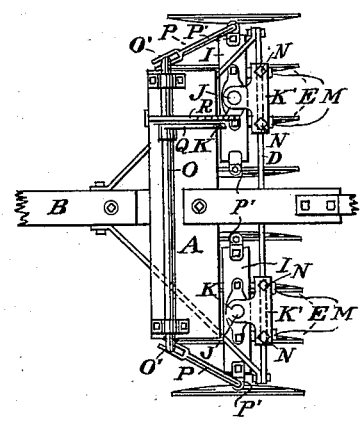

CAMPBELL T. SETTLE, OF SAN JOSÉ, CALIFORNIA.

REVERSIBLE DISK HARROW.

SPECIFICATION forming part of Letters Patent No. 609,560, dated August 23, 1898.

Application filed March 10, 1898. Serial No. 673,355. (No model.)

*To all whom it may concern:*

Be it known that I, CAMPBELL T. SETTLE, a citizen of the United States, residing at San José, county of Santa Clara, State of California, have invented an Improvement in Reversible Disk Harrows; and I hereby declare the following to be a full, clear, and exact description of the same.

My invention relates to improvements in that class of land-cultivating apparatus known as "disk harrows."

It consists, essentially, in a novel construction and mechanism for adjusting the framework upon which the disks are mounted, so that the apparatus can be used between rows of trees and work beneath the projecting branches thereof and in other places where such adjustments are desirable.

It also comprises details of construction which will be more fully explained by reference to the accompanying drawings, in which—

Figure 1 is a plan of my device. Fig. 2 is a side elevation. Fig. 3 is a one-half rear elevation. Fig. 4 is a plan showing the off and near side set of disks adjusted closer toward the center of the harrow. Fig. 5 is a plan showing a modification of the shaft O.

The object of the invention is especially to provide a machine which can be used between rows of trees and so extended as to cultivate close to the rows upon each side without danger of breaking the projecting branches, and the same apparatus can be then readjusted, so as to complete the cultivation of the central portion of the ground by a second operation.

A is the main frame or bed, having a pole B and a driver's seat C supported therefrom. Across the rear end of the bed A is the transverse beam D, which forms the support for the disks E and the extension-bars F, by which they are carried. The disks E are, as here shown, fixed in groups of any suitable number, as four, which I have here shown upon a shaft G. This shaft is supported from the lower ends of standards H, these standards extending upward into the channel-iron beam I. On the top of this beam is fixed the vertical pivot-pin J, which it turnable in a corresponding vertical box K. This box has at one side a channeled portion, as shown at K', which fits adjustably upon the extension-bar F, the slotted or channeled portion K' fitting over the bar and being adjustable thereon, so as to tilt the disks E outwardly or inwardly in vertical plane. This adjustment is effected by means of screws N, which raise or lower either end of the extension K' of the box K, and they are afterward locked in place by locking-bolts and nuts M. It is also desirable to turn the disks and their shaft about the vertical axis J, so that they are made to cut more or less to or from the land, and in order to effect this adjustment I have shown a shaft or shafts O journaled upon the bed A, having crank-arms O' at the ends. These crank-arms are connected by rods P with the adjacent ends of the beams I, from which the disks are supported and from which the vertical swivel or pivot pins J extend. It will thus be seen that by the turning of the shaft O the cranks O' will act through the connecting-rods P to turn the beams I about their vertical pivot-pin or axis, and they will thus be adjusted to cut at any desired angle.

The shaft O has a lever-handle Q extending upwardly and backwardly, and this has the customary latch adapted to engage with notches in the rack R, so as to hold the lever Q and with it the shaft O at any desired point of adjustment. This construction is employed when both sets of disks E are to be adjusted simultaneously; but if it is desirable to adjust one set independently of the other the shaft O may be made in two separate sections, each one having its own operating-lever and each one controlling the disks at one end of the apparatus.

The extension-bar F is movable upon the transverse bar D, so as to set the disks E at any desired distance from the central line of travel.

In my present illustration I have shown the apparatus as designed for cultivating the ground between rows of trees which are somewhat widely separated, and it being difficult to employ the disks so as to cultivate at one time the whole distance between the rows of trees I have designed these extensions, so that the two sets of disks are carried at the extreme ends of the extension-bars, so that they will cultivate the ground close up to the bodies of the trees and beneath the branches without in any way damaging the latter. After completing this work the extension-bars may be removed, if desired, and the journal-boxes K K' may be fixed upon the bar D, so as to run closely together at the center of the machine, and the intermediate surface can then be cultivated by again going over the ground with the machine.

My apparatus is exceedingly convenient for the purposes designed.

Connections P' for the rods P are made at each end of the beams I, so that by disengaging the rods the beams and the disks may be reversed end for end.

Having thus described my invention, what I claim as new, and desire to secure by Letters Patent, is—

1. In a disk harrow, a main frame, supplemental extension-bars adjustably attached transversely thereto, vertical boxes adjustably fixed to the ends of the extension-frame, revoluble disks mounted in groups upon axles, a bar having standards, to the lower ends of which the axles are journaled, a vertical central swivel-post in each vertical box about which the bar and disks are turnable, a horizontal shaft journaled transversely upon the bed of the machine, crank-arms at the ends of the shaft and rods connecting the crank-arms with the ends of the swivel-beam, and an actuating-lever and pawl-and-rack mechanism whereby the shaft may be turned and locked at any desired point.

2. In a disk harrow, a main frame, transverse extension-bars adjustable outwardly from the center of the main frame, vertical boxes adjustably fixed to the ends of the extension-frame and adapted to be tilted from side to side thereon, beams having vertical pivots turnable in said boxes and standards projecting downwardly from said beams in which the shafts of disk harrows, mounted in groups, are journaled.

3. In a disk harrow, a main frame, transverse extension-bars adjustable outwardly from the center of the main frame, vertical boxes adjustably fixed to the ends of the extension-frame, beams having vertical pivots turnable in said boxes and standards projecting downwardly from said beams in which the shafts of disk harrows, mounted in groups, are journaled, and mechanism whereby the disk harrows are turnable about the vertical journal-pins, consisting of one or more shafts journaled transversely upon the main frame, with an actuating-lever and pawl-and-rack holding mechanism, crank-arms formed upon the shafts and rods adjustably connected with said cranks and with the adjacent ends of the disk-carrying and vertically-journaled frame.

In witness whereof I have hereunto set my hand.

CAMPBELL T. SETTLE.

Witnesses:
S. H. NOURSE,
JESSIE C. BRODIE.